April 9, 1940.   R. L. HASCHE   2,196,766
EXPANSION JOINT
Filed July 10, 1937

Rudolph Leonard Hasche
INVENTOR.
BY *N. M. Perrins*
*Daniel J. Mayne*
ATTORNEYS

Patented Apr. 9, 1940

2,196,766

UNITED STATES PATENT OFFICE 2,196,766

EXPANSION JOINT

Rudolph Leonard Hasche, Kingsport, Tenn., assignor to Eastman Kodak Company, Rochester, N. Y., a corporation of New Jersey Application July 10, 1937, Serial No. 153,043

8 Claims. (Cl. 285—90)

This invention relates to conduit joints and more particularly to joint construction for withstanding extremely high temperatures.

The usual type of pipe joint or other type of connection interposed between two conduits is of such construction that it is not suitable for very high temperature use. For example, various type connections are known for use between two metal conduits or between a metal conduit and a solid rod or the like. In oil cracking apparatus, there are disclosed certain type joints between metal conduits which will withstand heated conditions encountered in oil cracking work. However, there are instances in the industry where the temperatures to be employed are so high that it is desirable that a joint or connection be employed between metal and ceramic conduits or there are instances in the industry where ceramics suitable for withstanding high temperatures would be employed provided suitable connection could be made therefrom with other conduits.

I have discovered a conduit connection which is suitable not only for low and moderate temperature use but which will also withstand extremely high temperatures.

This invention has for one object to provide a conduit connection which will withstand exceedingly high temperatures. Still another object is to provide a pipe joint connection that is suitable for use in connecting ceramic and metal elements. Still another object is to provide a pipe joint connection that is suitable for use in high temperature chemical equipment. Still another object is to provide a conduit joint which will withstand temperatures in excess of 800° C. A still further object is to provide a conduit joint in which there may be some freedom of movement in all of the various planes. Another object is to provide a conduit connection in which the temperature may be controlled, for use between metal and ceramic conduits. Still another object is to provide a method of fitting ceramics against metal couplings. A still further object is to provide joints particularly adapted for vertically-positioned refractory conduits. Other objects will appear hereinafter.

For a further understanding of my invention, reference is made to the attached drawing.

Figure 1:
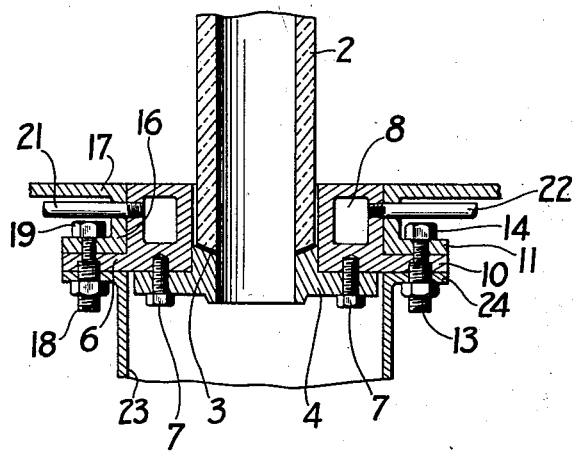
Fig. 1 is a fragmentary side elevation view diagrammatically illustrating one embodiment of my conduit connection.

Referring now to Fig. 1, a ceramic conduit 2 to be connected at its connecting end, is ground to fit a seat of spherical shape 3, and the conduit rests thereon in such a way that if it is tilted slightly from the vertical, there results but a slight sliding of two substantially concentric spherical areas that maintain snug contact, as is of course desirable. Preferably, there is placed between the said cooperating surfaces, a gasket such as of copper and asbestos, to improve gastight relationship as well as to facilitate the sliding of the surfaces. The seat 3 is formed in a flanged fitting 4 which may be made fast to a flanged hollow ring 6 by means of a plurality of cap-screws 7. The annular chamber 8 carries fluid as water for cooling. While I show and describe the seat and cooling ring as two pieces, for ease of removal in repairing, inspection or the like, it is to be understood that I also contemplate constructing the fitting in one piece, if desired.

The said hollow ring 6 in turn has a flange 10 which is made fast to a flange 11 through the agency of a plurality of shouldered studs 13 cooperating with nuts 14. Flange 11 may be part of a support structure 17 by means of collar 16 which is integral with both. The said collar 16 is of large enough diameter for the hollow ring 6 to slide within it, and dimensions of the two cooperating parts are such that when they are in operating relationship, the upper faces of support 17 and the hollow ring 6 substantially coincide. At the same time, fluid connection from the ring 6 to the outside is made through nipples 21 and 22 threaded into the said ring. The said nipples pass preferably between adjacent studs 13, 14, 18, 19 and through holes formed in the collar 16, to be threaded into the hollow ring 6 as shown, in fluid relationship.

At 23 is a conduit made fast to the studs 13 through the agency of nuts 14 that draw up the flange 24 of conduit 23 against the flange 10 of the hollow ring 6, in gas-tight operating relationship, as preferably with a gasket (not shown) between them.

Figure 2:
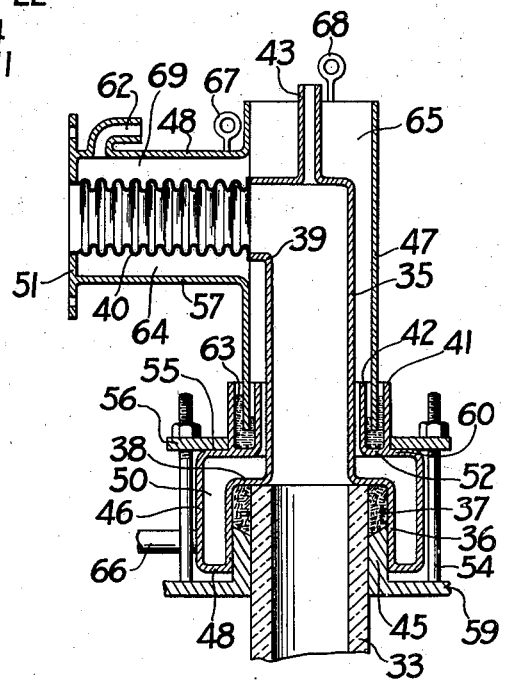
Fig. 2 is also a semi-diagrammatic side elevation view in sections showing another embodiment of my conduit connection between ceramic and metal.

In Fig. 2 the end of the conduit 33 abuts a shoulder 38 approximately integral with the conduit portion 35 of internal diameter approximately that of the inside of tube 33. At 39 the tube-portion 35 may make a turn from vertical to horizontal, if desired, making gas-tight connection with the corrugated flexible conduit 40.

The said flexible tube 40 in turn may be made gas-tight at its far end, to the flange 51 which in turn serves for making connections to piping not shown. It is, of course, apparent that conduit 35 might be constructed without the turn.

Referring further to Fig. 2, 43 is a nipple integral with the tube 39, and making communication to the inside thereof. The said nipple 43 is also substantially concentric with the tube 33, and thus serves for a means of introducing a thermo-couple or other device within the conduit, for measuring the temperature, pressure, etc., of the assembly at any level. Although not shown, the thermocouple or other device of course is fitted into the nipple 43 in a gas-tight manner so as to prevent entry of air into tube 35, or exit of components therefrom. This construction may be omitted, if desired, inasmuch as some uses of my equipment does not require that such measurement be made.

Gas-tight relationship between the ceramic conduit 33 and the tube-portion 35 is made through the gland 45 surrounding the said conduit 33 and surrounded by a cylindrical wall 36 which is integral with the shoulder 38. Between the tube 33 and the wall 36 is a suitable packing 37, preferably of asbestos, which effects gas-tight cooperation between conduit 33 and the tube-portion 35 in virtue of pressure exerted on said packing by the flange 38.

The wall 36 is integral with a flange 48 which in turn is integral with a cylindrical wall 46 of substantially larger diameter than that of the wall 36, and surrounding it so as to form an annular space 50. The said wall 46 also extends beyond the upper end of said wall 36, and is integral with an internal flange 60. The said flange 60 has a hole of diameter appreciably larger than the outside diameter of conduit-portion 35, and concentric therewith, so that the said tube-portion may extend through the said flange without touching it, and in fact with the benefit of considerable clearance, for reasons to be set out.

Coaxially integral with the internal flange 60 are two concentric collar portions 41 and 42, the former having an internal diameter preferably that of the periphery of the said flange 60, and the latter having an internal diameter approximately midway of those of the said collar portion 42 and the cylindrical wall 46. Thus there is formed between the two portions 41 and 42, an annular trough to serve as a seal in cooperation with a vertical tube 47 of diameter suitable for fitting loosely therein. The said tube 47 extends upwardly to a point just below the upper end of the nipple 43, while if a turn is constructed a tube 48 of about the same diameter as tube 47, communicates therewith in a conventional pipe-T relationship. The said tube 48 is further located at a point to be concentric with the flexible tube 40, and at its free end makes integral connection with the flange 51. With this spatial relationship, the vertical tube 47 extends well down into the trough 52, not so far as to touch the bottom of it, but in fact allowing considerable clearance, again for reasons to be made clear.

The flange 60, toward its outer edge, that is, beyond the conduit portion offers a shoulder 55 to receive a flange 56 loosely thereon. The said flange 56 has an external diameter considerably greater than that of the tube-wall 39, and approximately that of the flange 59 of the packing-gland 38. While the said gland flange 59 has a plurality of studs 54 integral therewith and extending upwardly and spaced approximately equally in a circle about the wall 39, the flange 56 has a circle of holes toward its outer edge consecutively coaxial with the said studs 54 so as to engage them. The upper threaded ends of the said studs 54 pass through the said holes in the flange 56, so as to cooperate with means that draw them upward. Thus is the gland 45 upwardly thrust against the packing 37 as desired.

The foregoing description of the fitting made fast to the end of tube 33, makes it clear that there is free communication between the chambers 50, 64, which thus together form a jacket suitable for cooling the assembly that may carry hot materials from the tube 33 to 51. To make the said jacket function, nipple 62 is supplied for making communication with the chamber 69, and to serve as an overflow for exit cooling fluid. Cooling medium entering through nipple 66 fills chambers 50, 64, and 69 in order, and rises in the tube to the level 65 maintained by the overflow nipple 62. Mercury 63, or other material in the trough 52 acts as a seal and prevents fluid from escaping at that point. In this manner it is obvious that all the piping handling materials at high temperatures delivered by the upper end of the tube 33 is effectively kept from burning, melting or otherwise deteriorating. Particularly is this of advantage in the service of the corrugated tube 40, which necessarily is frail, but nevertheless a desirable feature in assuring best service from the pipe joint.

It is to be expected that in the course of the use of the tube 33, and particularly in beginning operations, there will be endwise expansion, and contraction, as well as bending and twisting caused by non-uniformity in the conduit material, and irregularity in heating thereof. It is herein considered to be apparent from the description of the assembly as shown in Fig. 2, in view of the detail presented in the said figure, how conduit 33, while being held in perfectly suitable gas-tight relationship with its lower and upper cooperating fittings, is yet free to follow any thermal motions to which it may be subject.

Thus, though the conduit 33 at its upper end may be tilted due to bending, ample clearance is provided between tubes 35 and 47 so as to obviate binding between them, while obviously the end of the flexible tube 40 affixed to the conduit 39, follows the movements thereof. Twisting of conduit 33 likewise is tolerated by the said flexible tube 40.

To assure that the tube 47 does not bind in the trough 52, flange 41 may be bolted to a companion flange that is in suitable fixed spatial relationship to a support, while if necessary or advisable, the assembly consisting of tubes 47, 57, together with flange 41, may be counterweighted at a point indicated by the eyebolt 67 integral with pipe 48, and by the eye 68 integral or near the nipple 46.

Thus, in short, the combination of parts shown in Fig. 2 and described, and cooperating as described, eliminate substantially all strain on the conduit, with the one exception of compression at its upper end due to the gland and packing. The value of this accomplishment will be clear when it is appreciated that, at best, refractory ware such as may be used for conduit 33 is not very strong, while in the service of being heated through a severe temperature gradient not only through the wall of the tube, but also axially along the wall.

It may be pointed out also, that with respect to Fig. 1, cooling is preferably limited to what is necessary for keeping the gasket on the seat 3 in good condition. Fig. 2 is in fact developed in sufficient detail to make it obvious that the cooling functions are intended as described.

The conduit joints described may be employed in various combinations. It is preferred to employ the joints of Figs. 1 and 2 in a vertical position. In this manner the weight of ceramic conduit 2 will provide sufficient pressure for making a tight contact with the seat 3. It is also preferred to use the joint shown in Fig. 1 for one end of the conduit and the joint shown in Fig. 2 for the other end thereof. However, it is possible to employ other combinations. That is, for example, it is possible to employ the construction shown in Fig. 3 in combination with the joints shown in Figs. 1 and 2. It is also possible to employ the type of construction shown in Fig. 2 for connecting a series of conduits.

Figure 3:
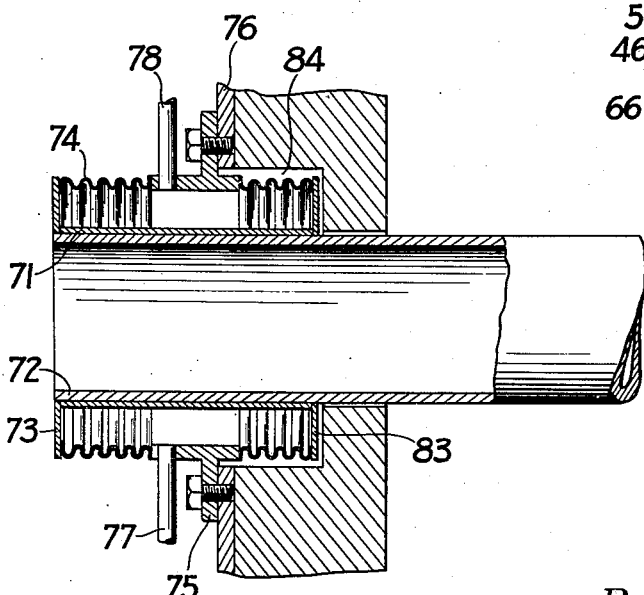
Fig. 3 is a side elevation view partly in section, showing another embodiment of my invention.

Reference is now made to Fig. 3. A steel sleeve 71 is shrunk on to ceramic tube 72. At either end of this steel sleeve flanges 73 and 83 may be welded or otherwise securely attached thereto. To the end flanges a bellows construction 74 and 84 may be brazed or otherwise securely attached. These bellows are also fastened to a large central flange 75, which encircles the tube as do the bellows and other members. This flange may be bolted to a tube sheet 76 or other construction such as a metal conduit, in which event the conduits 77 and 78 for conveying cooling medium may be positioned on the other side of member 76. It is also apparent that another conduit might be attached at 73 to provide a continuation of conduit 72. Suitable gaskets (not shown) to provide tightness may, of course, be inserted where necessary, or desired.

The functioning of my apparatus is more or less apparent from the preceding description. However, the following explanation relative to functioning is set forth. Referring to Figs. 1 or 2 the ceramic tubes 2 or 33 may be positioned in a furnace and heat applied thereto. The metal conduit 35 or seat 3 would be connected to the heated ceramic tubes in the manner shown. The materials fed through the ceramic tubes and heated therein may be conducted away through the metal conduit 23, (Fig. 1) or conduit 35 (Fig. 2). The heating, by means of the gas-tight construction of the joints of my invention, of the ceramic tubes to temperatures greater than 800° C. does not cause cracking or breaking of the joint because of non-rigid construction.

Preferably, in such a construction in a furnace as described, the tube would be positioned vertically with the connection shown in Fig. 1 on the lower end thereof and a connection in accordance with Fig. 2 on the upper end thereof. Such a combination of conduit connections is particularly useful in joining metal conduits to ceramic cracking tubes used in processes for heating hydrocarbon liquids or vapors at high temperatures. Such hydrocarbon liquids or vapors may, of course, be mixed with steam, carbon dioxide or various other diluents or materials.

The arrangement shown in Fig. 3 is particularly suitable for a horizontally extending conduit such as might extend through a sidewall. Such construction is encountered in oil-cracking or other chemical furnaces, superheaters, recuperators for steel furnaces and for numerous other processes. For the construction of Fig. 3 the end of the tube is non-rigidly attached, hence, when heat is applied to the ceramic tube there is no pulling away from the wall or support to which the end of the tube is attached. It is also apparent, as indicated, that provision for attaching another conduit may be made at 73 by bolting or otherwise fixing the flanged end of another conduit thereto.

The ceramic conduit may be comprised of silicon carbide, zirconium silicate or carbides, or various other ceramics which will stand high temperatures. The metal conduit may be comprised of steel or iron or the various alloy steels, such as for example, chrome steels containing from 15-40% of chromium, balance iron or chrome-aluminum and chrome-molybdenum steels. In some instances, chrome-nickel equipment may be employed. However, inasmuch as this may exert catalytic influence on materials passing through the conduit, some care should be exercised in the use of this alloy.

My apparatus is particularly advantageous because it provides a joint between a ceramic element and a metal unit, wherein the ceramic element may be heated to temperatures substantially greater than 800° C. and in many instances as high as or greater than 1400° C. The materials traversing the interior of the tube, of course, are also at very high temperatures. It is readily apparent that if my conduit joint will withstand high temperatures, it will also withstand low temperatures. The exact sizes of the conduits, the amount of cooling medium and character of cooling medium to be circulated, as well as other details, will depend on the exact use to which my conduit joint is to be put. Such details will be readily apparent to one skilled in the art in view of the teachings herein.

From the foregoing, it is apparent that my invention is susceptible to some modification, hence, I do not wish to be restricted, except insofar as may be necessitated by the prior art and the spirit of the appended claims.

What I claim and desire to secure by Letters Patent of the United States is:

1. A pipe joint adapted to withstand temperatures in excess of 1000° C. for connecting metal and ceramic conduits, which comprises a heat-resisting ceramic conduit, a metal conduit, of a diameter approximately the same as the internal diameter of the ceramic conduit, which terminates in a shoulder and flange, said shoulder and flange abutting and embracing the end of the ceramic conduit, a packing gland between the ceramic conduit and flange, concentric collar means arranged for exerting pressure on the packing, flexible bellows joined to the metal conduit and a casing provided with a non-rigid jointure, said bellows, conduit and casing forming a chamber in which cooling fluid may be circulated, a pipe for conveying cooling fluid attached to the lower portion of the chamber, and means for maintaining the liquid level therein, connected with the upper portion thereof.

2. A pipe joint adapted to withstand the passage therethrough of materials at temperatures in excess of 1000° C., which comprises a ceramic conduit made up of materials from the group consisting of silicon carbide and zirconium silicate, a metal conduit which terminates in a shoulder and flange, said shoulder and flange abutting and embracing the end of the ceramic conduit, heat-resisting packing material between the ceramic conduit and flange, a concentric collar means cooperating with a second concentric collar having a flange for exerting pressure on the packing, flexible bellows joined to the metal conduit, a casing enclosing the first conduit and flexibly associated therewith thereby forming a chamber in which cooling fluid may be circulated.

3. An expansion joint which will withstand passage therethrough of materials at temperatures in excess of 1000° C., which comprises a ceramic conduit, a metal conduit which terminates in a shoulder and flange, said shoulder and flange abutting and embracing the end of the ceramic conduit, a gland containing packing material between the ceramic conduit and flange, concentric collar means arranged for applying pressure on said packing material, flexible bellows joined to the metal conduit, a cylindrical casing enclosing the metal conduit and flexibly associated therewith to form a chamber in which cooling fluid may be circulated, said casing having a trough around at least a portion of its circumference containing metallic filling material so that the casing is non-rigid and free to move sufficient for taking up strains induced by movement of the tube.

4. A conduit connection capable of withstanding extremely high temperatures, for joining a silicon carbide ceramic conduit to a wall element, which comprises silicon carbide ceramic conduit having a metal sleeve shrunk thereon, concentric flanges attached to the sleeve ends, a central flange, a flexible bellows associated with the central flange and concentric flanges to form a chamber in which cooling fluid may be circulated, conduits for conveying cooling fluid leading to said chamber, and means on the central flange for connecting it with the wall element.

5. A joint construction which will withstand the passage therethrough of materials at extremely high temperatures, comprising a silicon carbide conduit, asbestos gasket means associated with the end thereof, a heat-resisting 15%–40% chromium steel metal member in which water may be circulated embracing at least the end portion of said conduit provided with the gasket and tapped flange means attached to the metal member, adapted to be bolted to another unit.

6. A joint construction capable of withstanding extremely high internal temperatures, comprising a silicon carbide ceramic conduit, asbestos gasket means associated with the end thereof, a metal member of a 15%–40% chromium steel embracing at least the end portion of the said ceramic conduit, said metal member including an enclosed chamber in which a cooling fluid may be circulated, tapped flange means adapted to be bolted to another unit connected with the metal member, and conduits for conveying fluid leading to the enclosed chamber.

7. An expansion joint comprising a silicon carbide conduit, a metal member embracing at least the end portion of the said silicon carbide conduit in gas-tight relationship, asbestos packing material associated with the metal member, an enclosed chamber in which water may be circulated for cooling the metal member, in close proximity thereto, and a tapped flange means adapted to be bolted to another unit, connected with the chamber member.

8. An expansion joint adapted to withstand the passage therethrough of materials at temperatures in excess of 1000° C. which comprises a silicon carbide conduit, a metal conduit which terminates in a shoulder and flange embracing at least the end portion of said silicon carbide conduit, packing material between at least a portion of the silicon carbide conduit so embraced and said shoulder and flange, means for exerting pressure on the packing material, flexible bellows joined to the metal conduit, a casing enclosing the metal conduit and flexibly associated therewith thereby forming a chamber in which cooled fluid may be circulated.

RUDOLPH LEONARD HASCHE.